United States Patent [19]
Will et al.

[11] Patent Number: 5,566,575
[45] Date of Patent: Oct. 22, 1996

[54] ROCKER PIN LOAD CELL WITH A ROTATION LIMITER

[75] Inventors: Ronald Will, Alsbach; Markus Franz, Rossdorf; Ralf Waegner, Trebur; Hans-J. Gerlach, Hoechst; Werner Schlachter, Darmstadt, all of Germany

[73] Assignee: Hottinger Baldwin Messtechnik GmbH, Darmstadt, Germany

[21] Appl. No.: 465,732

[22] Filed: Jun. 6, 1995

[30] Foreign Application Priority Data

Dec. 13, 1994 [DE] Germany ............................. 9419696 U

[51] Int. Cl.⁶ ........................................... G01L 1/04
[52] U.S. Cl. ................... 73/862.629; 73/862.631; 73/862.635
[58] Field of Search ............... 73/862.629, 862.631, 73/862.632, 862.635; 177/211, 255

[56] References Cited

U.S. PATENT DOCUMENTS

| | | | |
|---|---|---|---|
| 2,488,348 | 11/1949 | Ruge | 73/862.629 X |
| 2,775,887 | 1/1957 | Hines | 73/862.629 X |
| 2,901,235 | 8/1959 | Bradley . | |
| 4,475,610 | 10/1984 | Schwarzschild | 73/862.629 X |
| 4,581,948 | 4/1986 | Reichow | 73/862.632 X |
| 4,804,053 | 2/1989 | Nordstrom | 73/862.629 X |
| 4,815,547 | 3/1989 | Dillion et al. | 177/255 X |
| 4,932,253 | 6/1990 | McCoy | 73/862.635 X |
| 4,955,441 | 9/1990 | Mills et al. | 177/255 |
| 5,090,493 | 2/1992 | Bergan et al. | 73/862.629 X |

FOREIGN PATENT DOCUMENTS 0419784  3/1994  European Pat. Off. .

OTHER PUBLICATIONS

Molen Brochure, Published ca. 1993.
Flintab Brochure, Published ca. 1993.
HBM Brochure, Published Dec. 1994.

Primary Examiner—Richard Chilcot
Assistant Examiner—Elizabeth L. Dougherty
Attorney, Agent, or Firm—W. G. Fasse; W. F. Fasse

[57] ABSTRACT

The rotation of a rocker pin about the longitudinal pin axis in a rocker pin load cell is limited by a collar (7) directly connected to a pin end and having spaced stop surfaces (11, 12; 11', 12') cooperating with a stop stud (8) mounted in a socket (4 or 3) in which the pin end with its collar (7) is held. The long axis of the stop stud extends in parallel to the pin axis in its normal vertically aligned position.

8 Claims, 1 Drawing Sheet

ROCKER PIN LOAD CELL WITH A ROTATION LIMITER

FIELD OF THE INVENTION

The invention relates to a rocker pin load cell including a rocker pin with two ends and at least one support socket in which one of the two ends of the rocket pin is supported. Such load cells are generally equipped with a device for limiting a rotational movement of the rocker pin about its longitudinal axis.

BACKGROUND INFORMATION

Load cells of this type are used, for example, in weighing scales such as platform scales and especially in bridge scales for weighing vehicles. A plurality of such rocker pin load cells are arranged between the weigh bridge or platform on the one hand and a foundation on the other hand. The weigh bridge or platform is horizontally movable within permissible limits so that the rocker pins of these load cells perform rocking movements to accommodate these horizontal movements of the weigh bridge or platform. Under normal operating conditions these rocking movements do not exceed an angular range of about 10° relative to the vertical. Due to these rocking movements the load cells are exposed not only to vertical forces caused by the loads to be weighed, but also to transverse load components. As a result, it is possible that the load cells perform undesirable rotational movements about their longitudinal axis. Such rotational movements may go as far as tearing the cable connection to the load cell.

U.S. Pat. No. 2,901,235 (Bradley) issued on Aug. 25, 1959 discloses a platform supporting structure for weighing scales with a feature for limiting the rotational movement of the rocker pin in the load cells about their longitudinal axis. A plate 37 rigidly secured to the load cell extends in parallel to the longitudinal axis of the load cell and cooperates with a stop screw 39 extending through a slot 40 in the plate 37. The screw is screwed radially into a fixed base 33. The slot 40 provides a permissible play between the plate 37 and the screw 39. In another version of the Bradley disclosure the load cell housing has an extension 61 with four cut-outs 63 that cooperate with ribs 62 secured to a base 59 for limiting the rotational movement. The cut-outs 63 are dimensioned to provide the permissible play between the extension 61 and the ribs 62.

European Patent EP 0,419,784 B1 (Mills et al.) discloses a weighing apparatus with self-erecting rocker pin load cells. One end of the rocker pin has a non-circular configuration sitting in a non-circular hole of a socket 52. Please see FIGS. 4, 5, 6 and 7 of Mills et al. The socket 52 is restrained against rotation by a notch 114 cooperating with a pin 116 mounted in a base 54. In another embodiment of Mills et al. an end 250 of the rocker pin is cylindrical but equipped with two wings 252 and 254 restrained in a base 260, please see FIG. 14. FIGS. 11, 12 and 13 of Mills et al. show further also rather complicated restraining devices. For example, FIG. 13 shows a radially projecting pin 236 reaching outwardly from the housing 232 into a gap between two also radially extending resilient bumper components 238 and 240 of a U-shaped bracket.

The above described prior art leaves room for improvement especially with regard to simplification and a more compact construction of the rotation limiting elements.

OBJECTS OF THE INVENTION

In view of the above it is the aim of the invention to achieve the following objects singly or in combination:

to construct a rocker pin load cell with a restraining device against rotation about the longitudinal rocker pin axis in such a way that the restraining elements substantially do not project outside of the load cell confines;

to make the rocker pin structure simpler and more compact as well as more economical; and to protect the restraining or limiting elements as well as the rocking surfaces with a flexible jacket against contamination.

SUMMARY OF THE INVENTION

A rocker pin load cell according to the invention is characterized in that a rotation limiting cooperates with a stop stud in a support socket of the respective rocker pin end. The collar is secured to one end of the rocker pin. The collar is provided with two stop surfaces formed either by a notch or by an elongated hole extending in parallel to the circumference of the collar. The stop stud extends in parallel to the longitudinal axis of the rocker pin and is mounted in the support socket in which the rocker pin end with the limiting collar is supported to cooperate with the stop surfaces in the limiting collar. The stop surfaces preferably extend radially relative to the longitudinal rocker pin axis. Even the end surfaces of the elongated hole that provide the stop surfaces, extend approximately radially.

This type of construction is especially simple because only a stop stud and a collar are required which take very little space to provide a compact structure that is preferably enclosed by a flexible jacket substantially positioned within the confines of the load cell. By using a separate flexible jacket at each end of the load cell the compactness is further improved because two small jackets can each have a smaller diameter than one all enclosing large jacket. The limiting collar is a simple stamped or cut sheet metal part which may, for example, be welded, brazed or soldered to the end of the rocker pin outside the load cell housing. Preferably, the collar is circular, whereby it may be produced on a lathe instead of as a stamped part. The notch or elongated hole may then be provided in the turned collar or ring either prior to its cut-off or after cut-off from the stock in the lathe.

The stop stud is a simple cylindrical pin that is secured directly to the support socket next to the support surface for the respective end of the rocker pin. This arrangement makes it possible that the collar with its stop surface, the housing of the load cell, and the at least one socket next to the collar can have approximately the same diameter resulting in a very compact structure because the stop elements do not protrude outside the contour of the load cell. Another advantage is seen in that a relatively small flexible jacket such as a bellows can enclose the end portion of the load cell housing and a portion of the respective support socket to thereby simultaneously enclose the stop elements.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
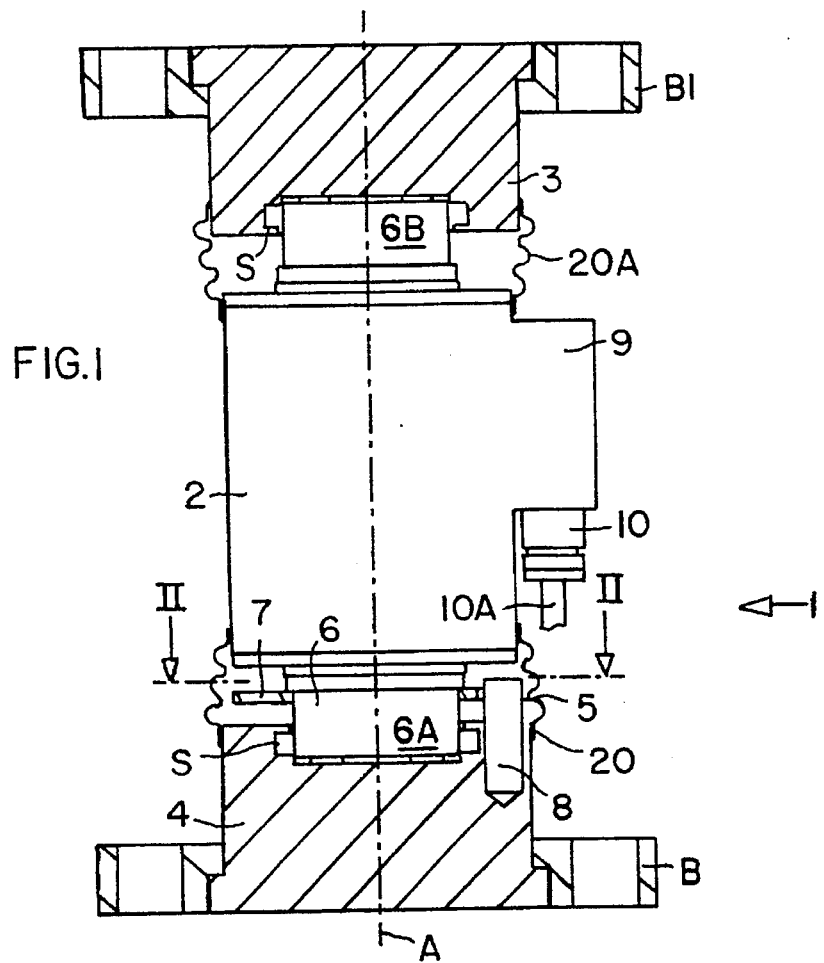
FIG. 1 is a side view, partly in section, showing a rocker pin load cell equipped with stop elements according to the invention.

FIG. 1 shows a load cell arrangement 1 having a central axis A and comprising a rocker pin load cell 2 with a rocker pin 6 mounted in a housing 9. The rocker pin 6 has a lower end 6A and an upper end 6B with axially outwardly vaulting spherical surfaces supported in a lower socket 4 and an upper socket 3 respectively. The sockets have plane horizontal surfaces on which the spherical surfaces of the pin ends 6A and 6B rest. Flexible seals S surround the pin ends within the respective socket recess. The lower socket 4 is mounted to a fixed base B. The upper socket 3 is mountable by a bracket B1 to a weigh bridge or platform not shown.

The rocker pin is provided with strain gages connected to an output terminal 10. The strain gages are not shown, but are connected to a signal processing circuit within the housing 9. The signal processing circuit in turn is connected to the output terminal 10. A cable 10A is connected to the terminal 10 and leads to a signal evaluating circuit as is conventional.

According to the invention a rotation limiter device 5 is incorporated into the components of the rocker pin load cell 2 so that the rocker pin 6 is prevented or limited in its rotation about the central vertical axis A. The limiter 5 comprises a collar 7 rigidly secured to one end of the rocker pin. As shown, the collar 7 is rigidly secured to the lower end 6A of the rocker pin 6. However, the components for the rotation limiter 5 may instead be incorporated into the upper end of the structure. The rotation limiting collar 7 cooperates with a stop stud 8 mounted in the lower socket 4, for example.

Figure 2:
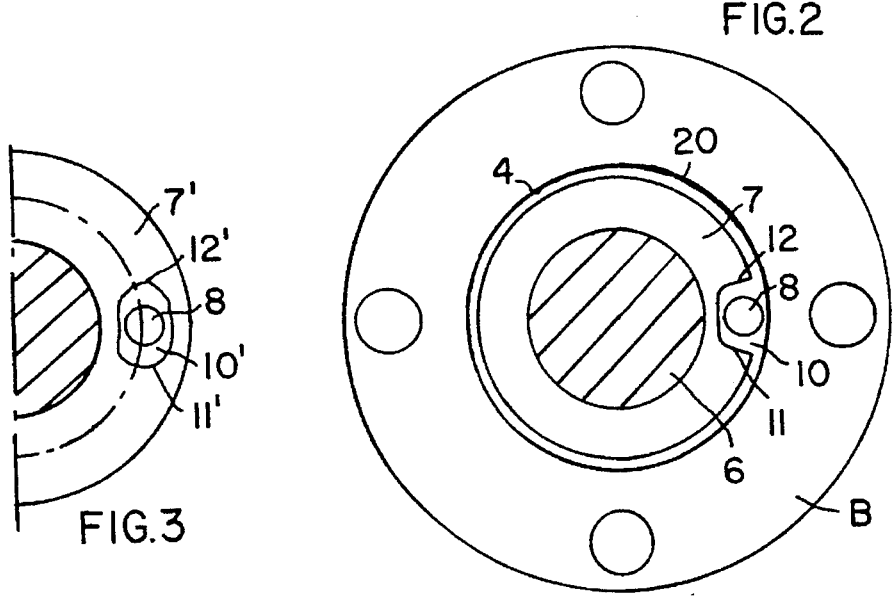
FIG. 2 is a sectional view along section line II—II in FIG. 1 and shows a stop collar with a notch.

Referring to FIG. 2 the collar 7 is provided with a notch to form stop surfaces 11 and 12 extending approximately radially relative to the central longitudinal axis A. The rotation limiting collar 7 can be made by stamping sheet metal and then, for example, welding the collar to the projecting end 6A or 6B of the rocker pin 6.

Figure 3:
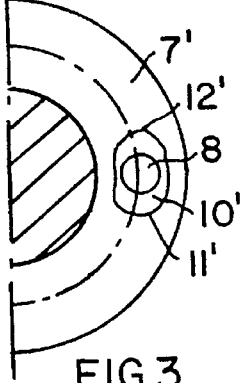
FIG. 3 shows a modified stop collar with an elongated stop hole.

FIG. 3 illustrates an embodiment in which the collar 7' is provided with an elongated hole 10' rather than with a notch. The longitudinal extension of the hole 10' extends approximately in parallel to the circumference of the collar 7'. The end edges of the elongated hole 10' also provide stop surfaces 11', 12'. Even these stop surfaces 11', 12' extend approximately radially to the central axis A.

In all embodiments the stop stud 8 is mounted in the respective socket 4 or 3 in a position so that the longitudinal axis of the stop stud 8 extends in parallel to the longitudinal axis A of the rocker pin 6. As shown, the stop stud 8 is for example a cylindrical pin received in a dead end bore of the respective socket 4 or 3.

The length of the stop stud 8 and the position of the collar 7 on the respective end of the rocker pin 6 is so selected that even if the rocker pin assumes a position of maximal inclination relative to the axis A when the latter is in its vertical position, the engagement of the stop stud 8 with the surfaces 11, 12 or 11', 12' is still assured while simultaneously making certain that the collar 7 does not contact the respective neighboring top surface of the socket 4 or the down facing surface of the socket 3. Similarly, the top end of the stop stud 8 must not come into contact with the bottom of the housing 9.

The stop surfaces 11, 12, 11', 12' face each other and are spaced from each other in such a way that the resulting play assures that the rocker pin can rock within the permissible range of a cone jacket having its tip where the spherical surface of the respective rocker pin end contacts the socket surface in the longitudinal axis A. Such a rocking movement is normally limited to an angle of about 10°, whereby the respective cone jacket has an opening angle of about 20°.

In order to protect the mounting of the rocker pin ends in the respective sockets against contamination, two flexible jackets 20, 20A are provided. These jackets are connected with one end to the respective socket and with the other end to the neighboring end of the housing 9. Preferably, these jackets 20, 20A are flexible or elastical bellows. The rotation limiting device 5 according to the invention with its elements 7 and 8 is small enough and so positioned that the bellows 20 fully encloses and protects the device 5. This is an advantage of the invention because the device is not only protected, it is also out of the way so as not to interfere with the installation of the arrangement 1 in a limited space.

The present rotation limiting device 5 is suitable for example for platform scales or weigh bridges for weighing vehicles, or for container weighing scales. Further possibilities for using the present improvement on rocker pin load cells are described in a brochure "Installation of Load Cells" by Hottinger Baldwin Messtechnik GmbH of Darmstadt, Federal Republic of Germany.

In all instances it is possible to properly select the radii of the spherical end surfaces of the rocker pin 6 to obtain, for example, a self-righting (stand-up) feature of the rocker pins or to make sure that such stand-up is avoided. These radii selections are conventional.

Although the invention has been described with reference to specific example embodiments it will be appreciated that it is intended to cover all modifications and equivalents within the scope of the appended claims.

What is claimed is:

1. A rocker pin load cell having a longitudinal pin axis, comprising a rocker pin (2) having two rocker pin ends, at least one support socket (3 or 4) for supporting at least one rocker pin end of said rocker pin, a rocker pin rotation limiting collar (7) rigidly connected to said one end of said rocker pin (2) received in said at least one socket (3 or 4), said limiting collar having an opening (10, 10') forming two stop surfaces (11, 12) spaced from each other and facing each other, a rocker pin rotation limiting stop stud (8) rigidly mounted to said one socket (3 or 4) for cooperation with said stop surfaces (11, 12) of said limiting collar (7), said stop stud (8) having a longitudinal axis extending in parallel to said longitudinal pin axis, said rocker pin load cell further comprising at least one elastic jacket (20) enclosing said limiting collar (7) and said stop stud (8).

2. The rocker pin load cell of claim 1, wherein said limiting collar (7) is a circular ring, and wherein said stop surfaces (11, 12) of said opening (10, 10') in said circular ring extend approximately radially in said circular ring relative to said longitudinal pin axis.

3. The rocker pin load cell of claim 1, wherein said opening is an elongated hole (10') in said limiting collar (7), said elongated hole extending approximately in parallel to a circumference of said limiting collar (7), said stop stud (8) extending into said elongated hole (10').

4. The rocker pin load cell of claim 1, wherein said stop stud (8) is a cylindrical pin.

5. The rocker pin load cell of claim 1, wherein said one socket and said limiting collar (7) have approximately the same diameter.

6. The rocker pin load cell of claim 1, wherein said elastical jacket (20) is a bellows.

7. The rocker pin load cell of claim 1, further comprising a housing (9) having a first housing end and a second housing end, said two rocker pin ends projecting in opposite directions from said housing from said first and second housing ends respectively, wherein said elastic jacket (20) is connected with one jacket end to one of said first and second housing ends and with an opposite jacket end to said at least one support socket (4), so that said limiting collar (7) and said stop stud (8) are enclosed by said elastic jacket (20) between said one housing end and said one support socket (4).

8. The rocker pin of claim 7, further comprising a second support socket for the other rocker pin end of said two rocker pins, and a further elastic jacket (20A) also connected with one jacket end to the other housing end of said first and second housing ends next to said second support socket (3) and with an opposite jacket end to said second support socket, whereby each of said two rocker pin ends is separately enclosed by its respective elastic jacket (20, 20A).

* * * * *

UNITED STATES PATENT AND TRADEMARK OFFICE
CERTIFICATE OF CORRECTION

PATENT NO. : 5,566,575
DATED       : October 22, 1996
INVENTOR(S) : Will et al.

It is certified that error appears in the above-identified patent and that said Letters Patent is hereby corrected as shown below:

Column 2, line 18, after "limiting" insert --collar--.

Signed and Sealed this

Twenty-first Day of January, 1997

Attest:

BRUCE LEHMAN

*Attesting Officer*      *Commissioner of Patents and Trademarks*